United States Patent [19]

Hoffman, Jr. et al.

[11] Patent Number: 4,973,999
[45] Date of Patent: Nov. 27, 1990

[54] FILM HANDLING ARRANGEMENTS FOR SHEET FILM VIEW CAMERAS AND THE LIKE

[76] Inventors: Robert H. Hoffman, Jr., 7680 Buffalo Rd., Nashville, Tenn. 37221; John W. Gardner, 3105 Weller Rd., Silver Spring, Md. 20906

[21] Appl. No.: 381,199

[22] Filed: Jul. 18, 1989

[51] Int. Cl.⁵ ............................................. G03B 19/10
[52] U.S. Cl. .................................................... 354/176
[58] Field of Search ...................... 354/81, 86, 72, 106, 354/289I.111I186, 188, 180, 176, 276, 420, 202, 288

[56] References Cited

U.S. PATENT DOCUMENTS

| | | |
|---|---|---|
| 4,158,490 | 6/1979 | Gottschalk et al. ............... 354/81 X |
| 4,316,660 | 2/1982 | Ohtsubo et al. ...................... 354/420 |
| 4,354,752 | 10/1982 | Starp ................................. 354/187 X |
| 4,725,865 | 2/1988 | Hoffman, Jr. ........................ 354/276 |
| 4,801,793 | 1/1989 | Vaynshteyn ..................... 354/106 X |

FOREIGN PATENT DOCUMENTS

1278818  9/1968  Fed. Rep. of Germany ...... 354/186

*Primary Examiner*—Brian W. Brown
*Attorney, Agent, or Firm*—Evenson, Wands, Edwards, Lenahan & McKeown

[57] ABSTRACT

A film handling arrangement is disclosed for sheet film view cameras which includes an audible level alarm system. A combination camera back is disclosed which includes devices for motor-driven loading and unloading of disposable package envelopes with sheet film, light exposure meters, and optional video image devices.

28 Claims, 7 Drawing Sheets

FILM HANDLING ARRANGEMENTS FOR SHEET FILM VIEW CAMERAS AND THE LIKE

BACKGROUND AND SUMMARY OF THE INVENTION

The present invention generally is related to film handling arrangements for sheet film view cameras and the like. Large format sheet film view cameras have been used for some time by professional photographers. A standard 4×5 inch sheet film view camera and/or other large format sheet film view cameras are likely to be in the inventory of almost all professional photographers. For many commercial photographic assignments, such as photographs of architecture, landscapes, advertising models and advertising displays showing products, large format film is the best practical way to obtain the high quality photographs expected of commercial photographers.

Large format film cameras exhibit certain disadvantages as compared with small format roll film cameras, especially with respect to the photographer's convenience. Coupled with the large format of the sheet film to be used are relatively large, heavy and bulky camera components which must be transported to and from the site where the photographs are to be taken. Typically, the view cameras are mounted on a tripod and include universal adjustment possibilities for the orientation of the sheet film plane and the lenses so as to facilitate the optimum exposure of the sheet film in a precise manner. Typically the view camera will have a lens assembly mounted at one end of camera frame rails to be slidably and pivotably oriented with respect to the frame rails over a wide range of possible planes and angles. At the other end of the camera frame rails, a camera back for accommodating the sheet film holder assembly is mounted. The sheet film holder assembly is also mounted to be movable in a variety of planes and angles. Typically, the camera back assembly and the lens assembly section are mounted for relative axial movement with respect to one another along the camera frame rails. An expandable light tight bellows interconnects the lens assembly or camera head and the camera back assembly.

The LINHOF and SINAR brand cameras are exemplary commercially available view cameras of the type referred to herein.

The camera back assemblies of these view cameras include a so-called "ground glass" or "viewing glass" disposed adjacent the plane where the film will be when it is exposed, which viewing glass can be viewed from behind by the photographer to see the image which is to be photographed. The photographer adjusts the orientation and location of the camera head and its lenses and the camera back which is to hold the sheet of film to be exposed, by manipulating the various adjustment controls on the camera back and camera head while observing the image projected on the viewing glass.

Until recently, the film sheets themselves were carried in a rigid film holder which was adapted to slide into a lateral opening in the camera back to a position in front of the ground viewing glass after the camera was appropriately adjusted for taking a picture. Once the film holder was inserted into the camera back, a light tight slide was then removed laterally from the forward facing side of the film holder to allow exposure of the film by operating the shutter of the camera. Traditionally, the film holders held a pair of sheets of film which faced opposite of one another in the holder and were covered by respective light tight slide covers that could be manipulated by the photographer to accommodate exposure of the film and subsequent light sealing of the holder and film, and removal of the film holder from the camera. With these two sheet film holders, the photographer would simply remove the holder from the camera and invert the holder to accommodate exposing the second sheet of film. These rigid film holders being downloaded in a dark room after exposure. New sheets of film had to be uploaded in the holders in a dark room for subsequent shooting.

Certain disadvantages of the above-mentioned rigid reusable sheet film holders were avoided by the film package and holder arrangement described in commonly assigned U.S. Pat. No. 4,725,865 to Hoffman (Hoffman '865 Patent). In this Hoffman '865 patent, the sheets are housed, not in a reusable rigid film holder, but rather in a disposable envelope package. This envelope package solves many of the problems with the prior rigid holders in that the bulk of the film containers is substantially reduced as compared to the prior art holders. Also, a disposable film package is used, which itself included a light sealing slide envelope that could be manipulated in the camera backs and film holders, and removed in a light tight manner from the film holders, without requiring any dark room environment. It was thus possible to accommodate transportation to remote locations of a large number of sheets of film, without the bulkiness of the prior rigid reusable holders and without the need for downloading and uploading sheets of film into such holders at a remote location where the dark room environment was either inaccessible altogether or, at most, most inconvenient. These and other advantages are described in the Hoffman '865 patent.

The Hoffman '865 patent also describes a holder that is insertable in a view camera camera back much in the same manner as the prior art rigid holders were inserted. However, this holder includes provisions for accommodating the use of the disposable package, including provisions for accommodating the manipulation of the package envelope so as to facilitate insertion and anchoring of the film sheet for exposure and subsequent reclosing of the package and withdrawal of same.

Commercial embodiments of the Hoffman '865 patent film package and holder are now being marketed by KODAK under the product names READYLOAD and READYLOAD HOLDER.

Commonly assigned pending U.S. Patent Application Serial No. 07/279,079, filed Dec. 2, 1988 discloses a further film holder which is also especially advantageously adapted for accommodating the disposable film packages of the type described in the Hoffman '865 patent, as well as the disposable film packages marketed under the mark "Prochrome" by Polaroid Corporation. In this holder arrangement, manually operable closing mechanisms are provided for selectively clamping the film package serving to facilitate the insertion into the holder and anchoring of the package, the sliding movement of the outer envelope of the package to facilitate exposure of the film and the reclosing and removal of the light tight envelope with the exposed film.

In many instances, a professional photographer makes test exposures of the scene being photographed, by using instant process photographic films such as Polaroid film. Thus, after setting the camera in a ready-to-photograph position, with appropriate orientation of the film plane and the camera lenses, the photographer uses Polaroid instant film/print products to make one or more test photos to determine that the film and lens orientation, as well as the light settings and composition, are optimum. Prior art arrangements for accommodating such instant photography test photos include the Polaroid 545 holder which is insertable in a view camera back in much the same manner as the above-discussed rigid sheet film holders. However, the Polaroid 545 holder includes rollers for compressing the Polaroid film developing chemicals, which are contained in "pods" integral within film envelopes, so that the print-/film image is instantly developed upon removal from the holder. This Polaroid 545 holder can also accommodate non-instant sheet film packs including the disposable film package disclosed in the Hoffman '865 patent.

The above-described film-handling arrangements, including the use of the disposable packages with the substantially reduced bulk of material that has to be transported to remote sites and the flexibility of using and carrying more different types of film emulsions than previously was the case are quite advantageous. However, inconveniences and problems with view cameras still remain. For example, in those arrangements where the film package and/or film holder has to be inserted in the camera back after the camera is set in position for taking a photograph, the manual manipulations required may disturb the camera setting. That is, even though a perfectly aligned and focused image appears on the viewing glass, and/or video screen monitoring the image to be photographed, prior to the insertion of the film package and/or film holder, this precise positioning and alignment can be disturbed due to the inherent forces acting on the camera when one manually manipulates the devices for loading the film and pulling the light slide and/or the light tight envelope to accommodate exposure. Also, with these manually operable arrangements wherein the camera and the film holder or envelope must be also manually contacted by the photographer while the film is being changed, difficulties arise with respect to obtaining a precise registration of the film sheet in the same exact location for different packages of film and/or different holders being inserted into the camera at the same setup. Most times, multiple shots of the same scene, with different camera settings and/or different film emulsions, is desired, thus it often occurs that multiple film changes are desired at a single specific setting of a physical location of the film plane in the camera. Thus these problems regarding possible movement of the film holder and/or small changes in the exact registration location of the sheet of film, are important.

Another problem with film handling arrangements for large format sheet film cameras relates to the "leveling" of the film holder so that the film plane is exactly perpendicular with the local earth "tangent". In many instances the base upon which the camera tripod or other mount must be placed is an uneven surface, thereby tilting the film plane with respect to the true level position. For this reason, many prior art view cameras are provided with level indicators where the photographers can look at a carpenter's level bubble or the like to determine if the film holder and camera is actually level. However, these prior level indicator devices require that the photographer interrupt his viewing and composing on the viewing glass or video image of the picture to be taken so that it is difficult, if not impossible, to simultaneously precisely compose and focus the image while also precisely leveling the film plane. Also, some camera positions make viewing the levels difficult or impossible. Further, most studio work is in low light, so levels are often hard to see and read.

An object of the present invention is to avoid the above-discussed problems with respect to the convenience of handling sheet film changes and the possibility of disturbing the set position of the film plane. Another object of the present invention is to readily facilitate the simultaneous composition of images to be photographed while also maintaining the film plane in a precise level position, if required.

These and other objects and advantages of the invention are achieved according to the present invention by providing film holder arrangements which include two relatively movable holder parts defining a film sheet accommodating cavity therebetween, which parts are movable between an open position for accommodating insertion and withdrawal of the film and/or film package and a closed position for clampingly securing the film sheet in position and accommodating exposure of the film, wherein a control mechanism is provided for moving the first and second holder parts between the open and closed positions without the application of reaction forces that can cause camera movements, whereby a preset desired film plane position is maintained, even with multiple film sheet changes at the same set film plane location. In especially advantageous embodiments of the invention, the control mechanism for controlling the movement of the two film holder parts includes pneumatic driving devices which provide for a smooth, jerk-free loading, exposing, and unloading of the sheets of film. Certain preferred embodiments of the pneumatic models can be manually operated, dispersing with the need for electrical power. In other preferred embodiments, the holder control mechanism includes electric motor-driven actuators for moving the first and second holder parts between the open and closed position.

According to certain preferred embodiments of the invention, the simultaneous focusing and composition of the image to be photographed and the leveling of the film plane is facilitated by the provision of a non-optical level warning system which apprises the photographer of any deviations of the film plane from a predetermined level film plane orientation. This arrangement avoids an interruption of a photographer's observation of the image to be photographed on a viewing ground glass, video display or the like. In especially preferred embodiments, the alarm system is an audible alarm system which emits an audible signal whenever the film plane is out of a predetermined acceptable level range. The present invention contemplates different embodiments for activating the level alarm, including mercury bubble tip switch constructions and pendulum switches.

Preferred embodiments are contemplated wherein the film holder is provided as part of a detachably attachable camera back, which camera back is provided with an integrated light metering system for both strobe and ambient light as enters the camera back via the taking lens. In preferred embodiments, the light metering system includes electrical data interface means to communicate with automatic lens assemblies for the remote setting and function control thereof.

In certain preferred embodiments of the invention, the above-mentioned level alarm features and the film holder control features are combined in a single camera back. In certain preferred embodiments, the camera back is designed as a standard attachment for existing view cameras utilizing the "international" GRAF-LOK system; and includes the control systems for facilitating loading, exposing and unloading the sheets of film, the level alarm system, and provisions for optional viewing of the image to be photographed on a ground glass screen or via an external video display. In certain preferred embodiments, the film holder arrangement includes pressure roller squeezing devices for optionally utilizing instant photography processed film such as Polaroid film. This mentioned optional feature accommodates the desire of many photographers to be able to take test or "proofing" photographs preliminary to the final conventionally processed photographs.

Preferred embodiments are contemplated which include integral light meter measuring both strobe and ambient light with automatic computation of F-stop and speed choice. A bar code reader on the film pack/holder facilitates automatic accommodation of different film emulsions.

Those preferred embodiments that include a single unit replaceable camera back with automated features for accommodating the loading, exposing and unloading of the film package, as well as the level alarm and optional video viewing features, all cooperate together to provide an extremely convenient and reliable film handling arrangement for meeting the demands of even the most demanding professional photographers.

Other objects, advantages and novel features of the present invention will become apparent from the following detailed description of the invention when considered in conjunction with the accompanying drawings.

DETAILED DESCRIPTION OF THE DRAWING

Figure 1:
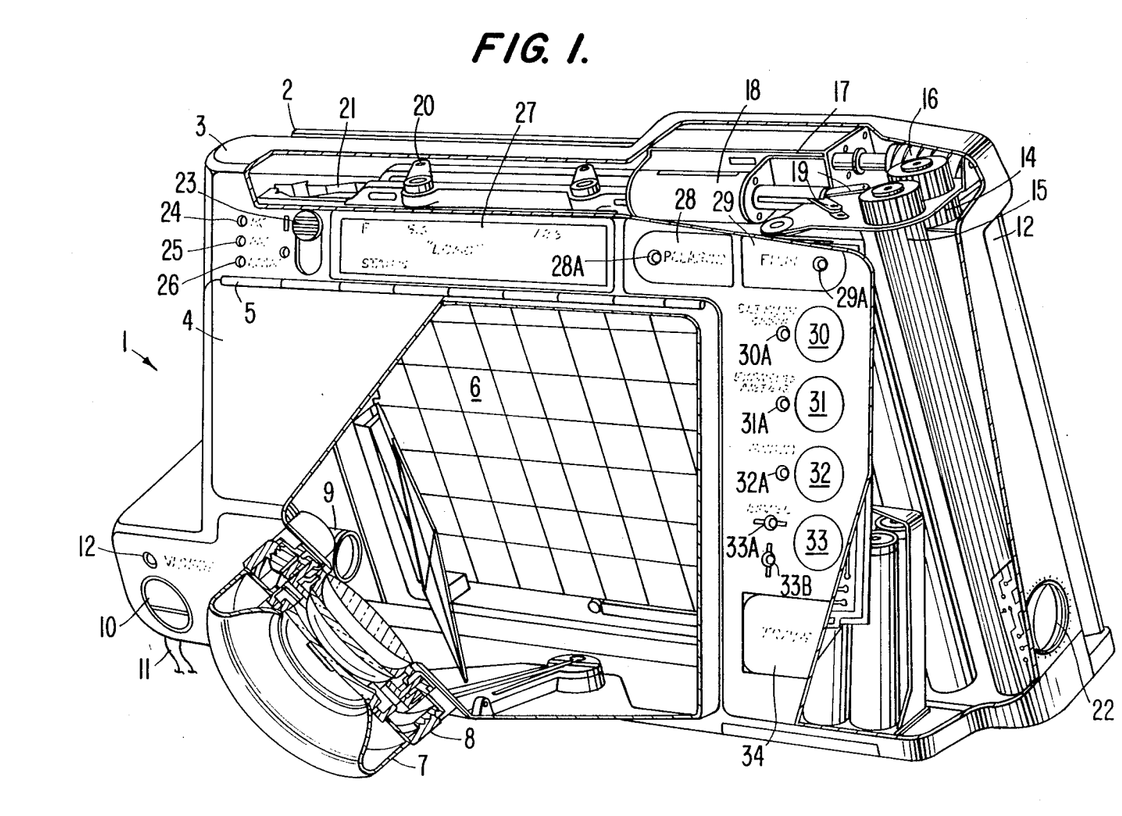
FIG. 1 is an oblique, partially cut-away view of a camera back constructed according to a preferred embodiment of the present invention.

Referring to FIG. 1, a camera back is shown which can be mounted as a unit on the back of an existing 4Δ×5" view camera by means of connecting flanges 2 which are compatible with the international standard "GRAF-LOK" back. The components of the camera back are housed in a hard plastic or metal casing 3. A viewing cover 4 is connected by a hinge 5 to the casing 3 and forms a light-tight cover at the rear of the casing 3, which cover 4 can be optionally pivoted upwardly to reveal a ground glass viewing screen 6. Mounted in the cover 4 is an optical viewing window lens configuration 7, which includes a selectively closable light slide. The photographer can view the ground glass viewing screen 6 with the cover 4 in a closed condition and can then selectively close a slide at the lens assembly 7. Focusing ring 8 is provided for accommodating manual adjustment of the focus of the lens assembly 7.

An optionally operated video viewing lens 9 is also disposed for selectively viewing the ground glass screen 6. A push button 10 is selectively operable to transmit a video signal via video signal lines 11. A video indicator light 12 is provided to indicate when the video is operating. The video screen, not shown, is disposed at a convenient location, either attached directly to the camera or camera tripod, or on a separate stand. The casing 3 is provided with a film package insertion opening at 12 which accommodates insertion of the film package 13 (FIG. 2) into a position parallel to and immediately in front of the viewing screen 6. The transport of the film package 13 into a position ready to photograph is controlled by driving rollers 14 and 15, driven by a worm gear 16 operated by transport motor 17. A hydraulic or pneumatic piston drive 18 is connected by toggle connections 19 to selectively control the opening and closing of the gap between the rollers 14 and 15.

Figure 2:
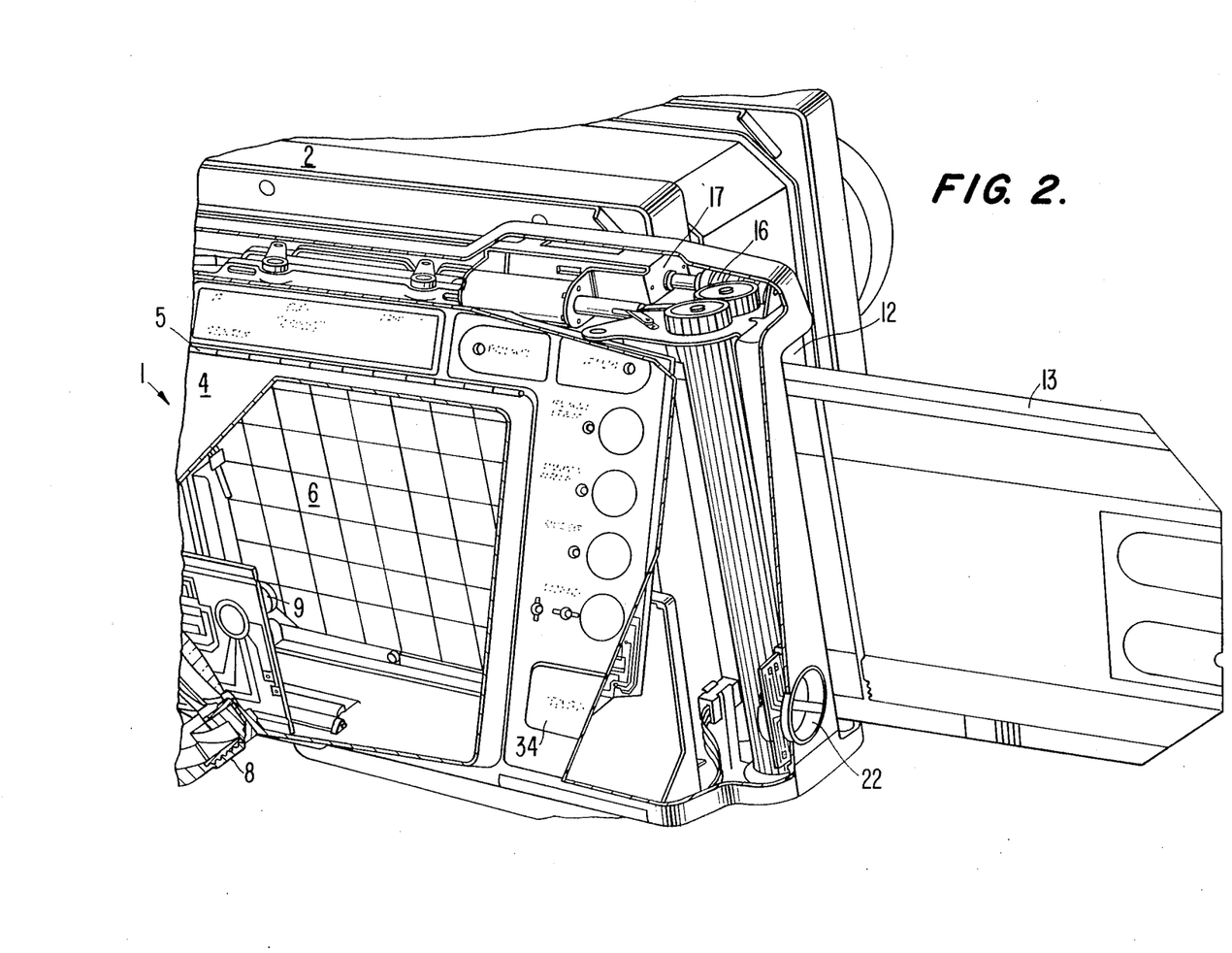
FIG. 2 is an enlarged schematic view of the camera back of FIG. 1, depicting a disposable film package partially inserted.

The film holder for anchoring the film in the camera during exposure with the envelope of the package 13 slid to the right is shown in FIG. 2, and includes a pair of relatively movable holder parts controlled by the schematically depicted pin and slot connection 20, 21 and a linear drive motor described in more detail below with respect to FIG. 4.

A film speed setting in control knob 22 is provided adjacent to slot 12 for the film envelope, and optionally provided is an electronic pick-up device for automatically detecting the speed and type (i.e., instant-to close rollers during "Process" mode or non-instant) of the film inserted from the previously coded film package. A film speed detector is disposed so as to detect the speed of the film automatically upon insertion of the film envelope and automatically adjust the covers to the detected film speed. Manual setting of the film speed is provided for those films that would require manual setting.

A switch 23 is provided for switching the electrical power for the systems of the camera back between an external alternating current source AC and a battery source. Indicator light 24 indicates activation of the AC power source. Indicator light 25 indicates activation of a sufficiently charged battery source and indicator light 26 indicates a setting on battery power but with an insufficiently (low) charged battery. A display screen 27 is provided at the top and center of the camera back and is connected to the operating systems of the camera and camera back so as to indicate the status, including the set shutter speed and aperture settings and, when all preliminary steps have been completed, emits a "load" signal. A pair of switches and indicators 28 and 29 are provided to accommodate adjustment and display corresponding to whether Polaroid instant photography film or non-instant film is being used. These switches could optionally be dispensed with and an automatic film package code reader could set the camera back for the respective type of film being used. The only difference for the Polaroid versus the regular non-instant film utilization has to do with the activation of pressure rollers for the chemicals utilized in the instant processing mode. The indicator lights 28A and 29A indicate respectively which setting is in effect.

On the right side of the casing, four control buttons and corresponding indicator lights are provided, including a button 30 and control light 30A for the film speed setting; button 31 and indicator 31A for the exposure meter setting; button 32 and indicator 32A for activation of the film package transport mode and button 33 and indicators 33A (horizontal level) and 33B for the level status of the film plane. At the lower right portion of the casing 3, a transport button 34 is provided for activating the film package transport drive 16, 17.

It will be understood by those skilled in the art of professional photography and view cameras that commercially available exposure meters, and film speed setting devices, including use of coded film packages can be integrated within the overall design. It will also be understood by those skilled in the art that available video display systems and lens assemblies for viewing the ground glass 6 and/or image to be photographed can be incorporated in the camera back 3 based on the present description. Accordingly, further description of the details of those devices will not be included herein. The following description will concentrate on those novel aspects of the invention which relate to the handling of the film package for loading, exposing and unloading the same, as well as to the novel audio level system accommodating appropriate orientation of the film plane without requiring the photographer to interrupt the viewing of the image to be photographed during the composition thereof.

Figure 3:
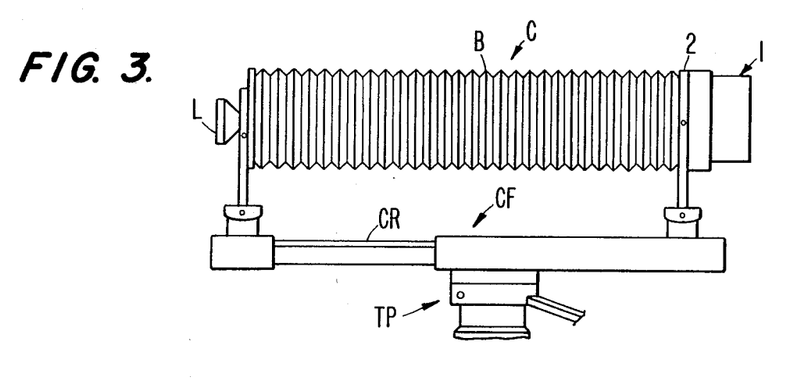
FIG. 3 is a schematic side view of a view camera with a camera back constructed in accordance with the present invention.

FIG. 3 is a schematic side view of a view camera of the type for which the camera back of the present invention is adapted. The camera C includes a lens assembly L and a camera back 1 (only schematically shown in FIG. 3) connected by a light tight bellows B. Both the camera back frame 2 and the lens assembly L are mounted for universal pivotable and axial movement in the X, Y and Z axis at a camera frame CF. The camera frame CF includes a pair of camera rails CR upon which the front and rear parts of the camera are relatively movable with respect to one another to accommodate focusing, etc. Such a view camera is exemplified by the commercially available camera sold under the trade name "SINAR". The camera and assembly in turn is mounted on a tripod TP which can also be pivoted and adjusted vertically. Since the universal adjustable mountings of both the front and rear assemblies of such view cameras are well known, the details thereof will be dispensed with herein, it being readily understood by those skilled in the art that such cameras exist and can be adjusted by various manual and automatic drive mechanisms.

The novel camera back for the present invention, as described is used in the following manner. Assuming the camera back is to be retrofitted to an existing 4×5 camera, the ground glass back on the existing camera is removed and the camera back 1 is attached to the camera back frame 2. The camera will then be adjusted with composition of the scene to be taken by viewing the image and the ground glass viewing screen 6 via the optical lens assembly 7 or via a video display activated by the button 10.

With the audio level system described herein, the composition of the scene to be photographed is done in the same manner as with conventional view cameras, with appropriate adjustment of the focus, the composition of the scene on the viewing screen 6, the exposure light settings, and the like. The audio level indicator system of the camera back of the present system provides for an audible signal whenever the film plane (which will be parallel to and correspond essentially to the plane of the ground glass 6) is not level. As depicted in the visual representations on the panel of the casing 3 by the indicators 33A, 33B, there is an indication of the level or audible level condition with respect to both the horizontal and vertical axis. With the audio level system described in more detail below, there will also be respective different audible level signals indicating out of level conditions in the X and/or Y plane, thereby facilitating the photographer's composition of the picture without having to interrupt his or her viewing of the scene or the necessity of visually observing bubble levels or any other visual display to be photographed while setting the level condition.

Once the scene has been composed and the camera is in a ready-to-expose condition, the film package is manually inserted into the slot 12 at the right side of the camera back casing 3, as shown in FIG. 2. At this time, the film holder will be in an "open" position to accommodate insertion of the film package without any resistance. If the motor-driven transport is not to be utilized and manual insertion of the film package is to be done, the same film package can be readily inserted into the fully inserted position at which time the film holder closing mechanism will be activated which will anchor the sheet film in the correct position and permit subsequent manual manipulation of the envelope by exposing the film in the manner as described in the above-noted Hoffman '865 patent. Optionally, a motor-driven anchoring clip can be provided for anchoring the left side of the film sheet or anchoring sheet carrying the film. Once the exposure has been completed and the enveloped closed to a light-tight condition, the holder mechanism is actuated to an open position, permitting a substantially free uninterrupted manual removal of the package. For an essentially completely automatic operation of the film holder mechanism, the transport mechanism can be actuated, which will activate the motor 17 and worm gear 16 to drive the rollers 15 and 16, after they have been appropriately moved to a transport position by the piston drive 18 and toggles 19, so as to mechanically control both the loading of the package and the subsequent exposure by moving the envelope a predetermined distance, the subsequent closing of the package, and the subsequent withdrawal of the sealed exposed package after the holder parts are moved to the "open" position.

Preferred embodiments are contemplated which dispense with the transport mechanism, whereby a less expensive camera back construction can be provided, which does still provide many of the advantages of the present invention, especially as regards the positive opening and closing of the film holder parts so as to accommodate manual loading, exposing and unloading of the film package without any undue mechanical disturbances of the camera back and camera setup.

Following is a description of various preferred embodiments for accommodating the above-mentioned opening and closing of the film package holder in the camera back.

Figure 4:
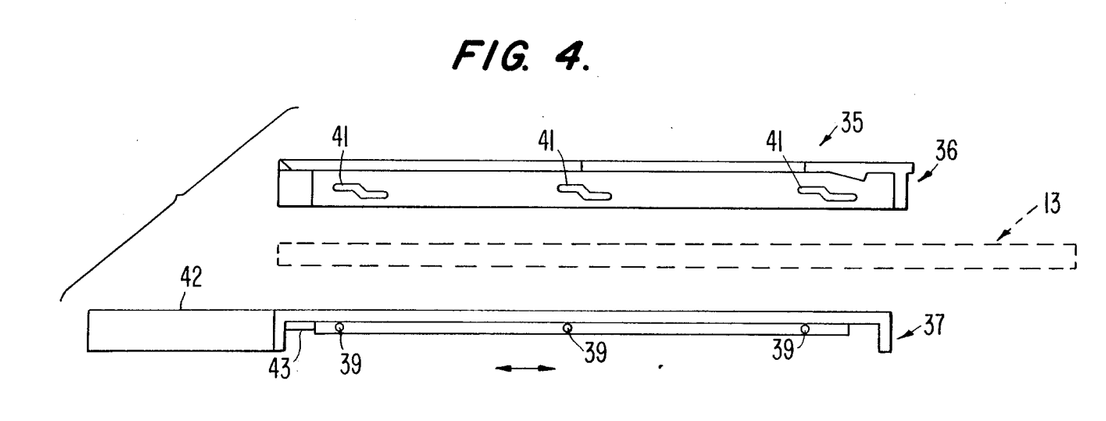
FIG. 4 is a schematic representation of a linear motor-driven film package holder constructed in accordance with a preferred embodiment of the present invention.

FIG. 4 is an exploded view of a film holder 35 having a top portion 36 and a bottom portion 37 between which the film package 13 is inserted. The top holder part 36 has a large aperture 37 for accommodating exposure of the sheet of film. As depicted by the arrows, the top portion 36 is movable with respect to the bottom portion 37 between an open position accommodating insertion of the package 13 and a closed position clamping the far left end of the sheet film and/or the sheet film carrier during partial withdrawal of the envelope to expose the film. Details of the film holder part structure 36, 37 are included in commonly assigned application Ser. No. 07/279,079 filed Dec. 2, 1988 (the '079 application). To the extent required for an understanding of the present invention, the contents of the '079 application disclosure are incorporated herein by reference thereto, it being noted that the primary difference in the holders of the present invention relate to the mechanism for actuating the slide carrier and pins described below for causing the relative movement of the parts 36 and 37. In the above-noted '079 application, the actuation is by means of a manually operated rotary handle.

The top and bottom portions 36, 37 are guidingly nested together so as to move perpendicularly to the plane of the envelope 13 to be inserted therebetween. The relative movement is effected by the engagement of camming pins 39 and a movable slide carrier 40 which is slidably mounted for movement as indicated by the arrow X with respect to the part 37. These pins 39 engage in camming slots 41 provided at the upper part 36. In the embodiment of FIG. 4, the side carrier 40 is driven by linear motor 42 via the axially movable linear actuator 43. Linear motor 42 may be a conventional electric motor with an axially movable actuator 43.

Figure 5:
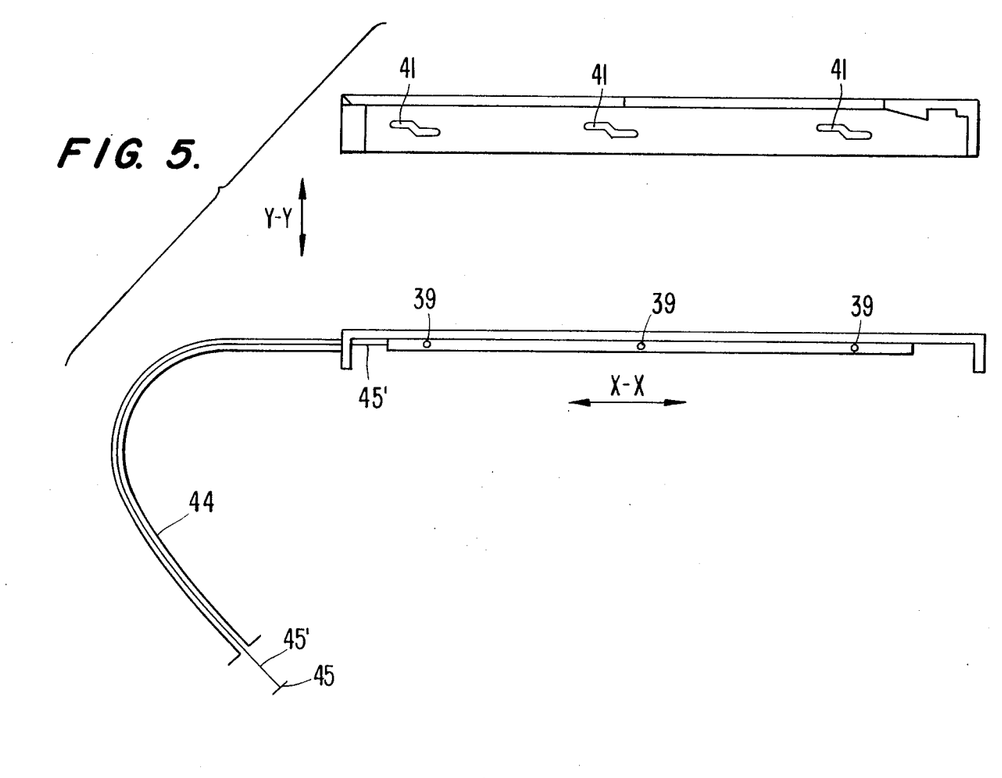
FIG. 5 is a schematic representation of a film holder constructed according to another preferred embodiment of the invention, utilizing a manually operated Bowden cable actuator.

FIG. 5 illustrates a further embodiment which is similar to FIG. 4 in all respects that, instead of the linear motor 42 and actuator 43, a Bowden cable drive arrangement 44 is provided which includes a manually operable actuator 45 which is connected at its other end 45' to the slide carrier 40.

Figure 6:
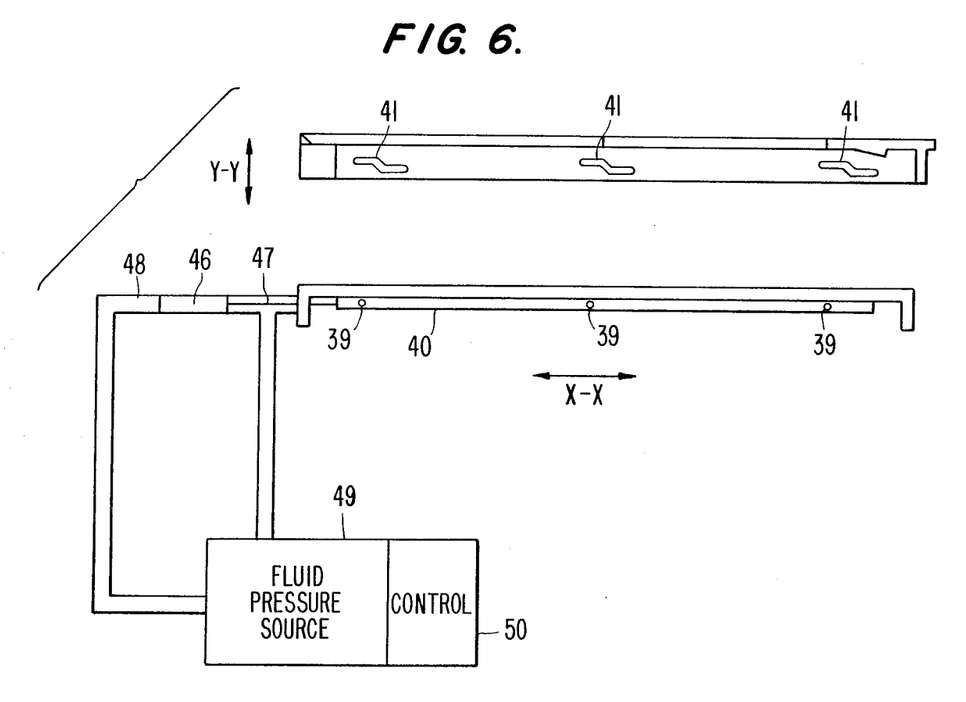
FIG. 6 is a schematic depiction of another preferred embodiment of a film holder, utilizing a fluid pressure driven piston actuator.

FIG. 6 shows yet another embodiment for actuating the film holder parts, which is in all respects similar to FIG. 4 and 5 except for the mechanism for driving the slide carrier 40. In FIG. 6 a piston 46 is connected by its piston rod 47 to the carrier 40, which piston 46 is disposed in a cylinder 48 to be acted upon by fluid pressure from pressure source 49. A control mechanism 50 is provided for controlling the fluid pressure force on the piston 46 so as to give a positive drive in both directions of the slide carrier 40.

Figure 7:
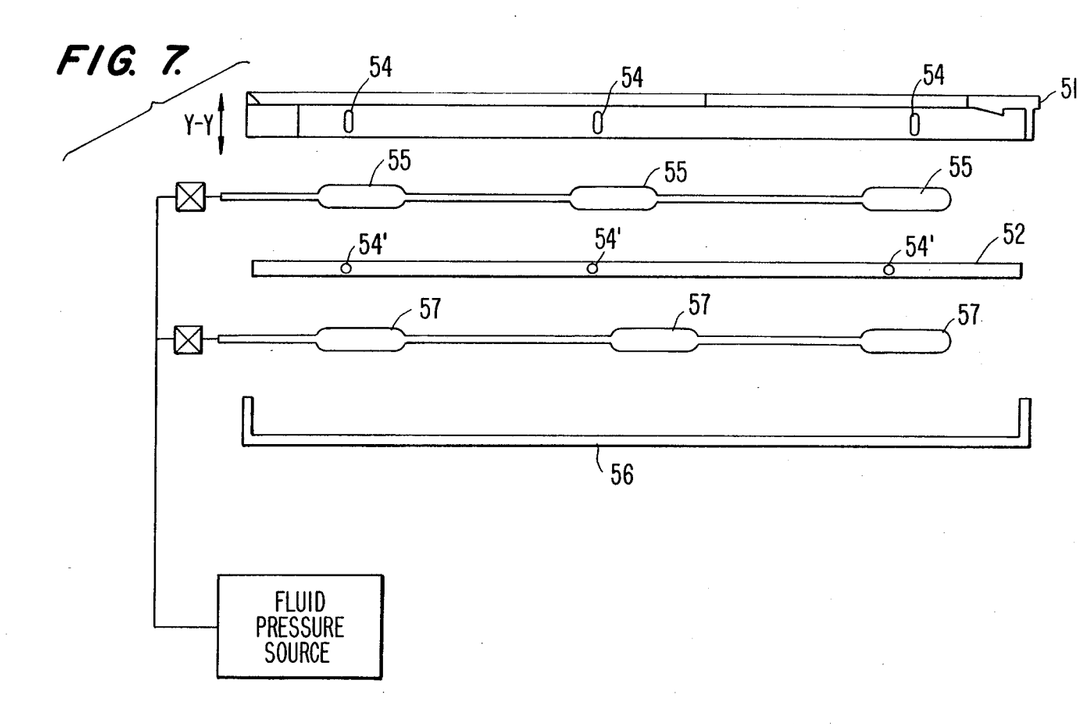
FIG. 7 is a schematic representation of another preferred embodiment utilizing inflatable bladders as actuators for some of the film holder parts.

FIG. 7 depicts yet another film holder embodiment which includes a top holder portion 51 and a lower holder portion 52 between which the film package 13 is inserted. The lower holder part 52 includes guide pins 53 engageable in slots 54 of the upper part 51 so as to guide the parts for vertical movement with respect to one another. A first set of inflatable bladders 55 are disposed between the parts 51 and 52 of the holder and, when inflated serve to separate the parts and open the holder for insertion of the film package. A reaction plate 56 and a second set of bladders 57 serve to accommodate positive closure of the parts 52 and 51 to clamp the film in the closed position. The bladders can be actuated manually by respective squeeze cushions. Alternatively, a fluid pressure source can be provided with appropriate valving to control the flow of fluid, preferably air, into and out of the bladders to close and open the holder parts.

Figure 8:
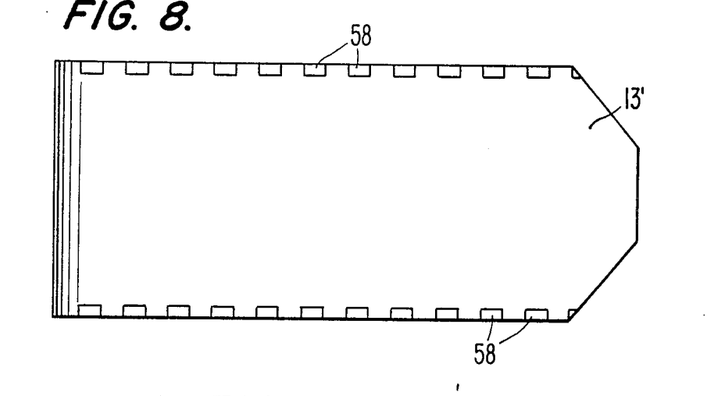
FIG. 8 schematic plan view of a film package, with engaging detents for a film package drive system constructed according to a preferred embodiment of the present invention.
Figure 9:
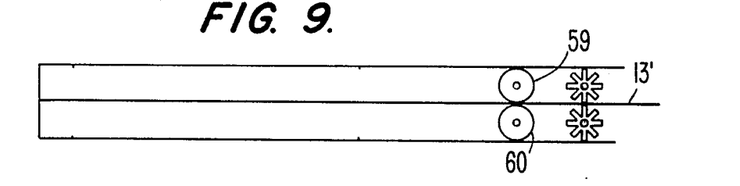
FIG. 9 is a side schematic view depicting a preferred embodiment of a holder and drive mechanism with optional instant film processing rollers, constructed in accordance with a preferred embodiment of the present invention.

FIG. 8 depicts a modified film package 13' which includes indentations 58 along the lateral edges of the packages for engaging in corresponding drive wheels 59 (see FIG. 9) to effect a positive predetermined control drive of the envelope 13' into and out of the holder. The drive wheels 59 are driven by a controllable electric motor. FIG. 9 schematically depicts the driving of the package 13' by means of the driving wheels 59. FIG. 9 also schematically depicts a pair of instant photography pressing rollers 60 which can be selectively moved from a spaced-apart position away from any contact with the envelope during operation of the holder and camera to an operative position where they operate to squeeze the film package and spread the chemicals therein for use with Polaroid film and other instant photography film.

Other embodiments are contemplated where the holder includes friction drive wheels engageable with non-indented film package envelopes to drive the movement of the envelope.

Figure 10:
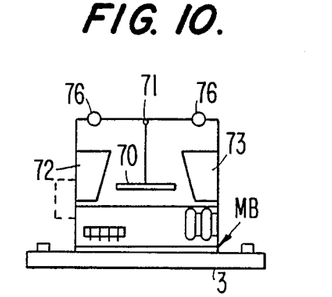
FIG. 10 is a schematic depiction of an audible level alarm system constructed in accordance with the preferred embodiment of the present invention.
Figure 11:
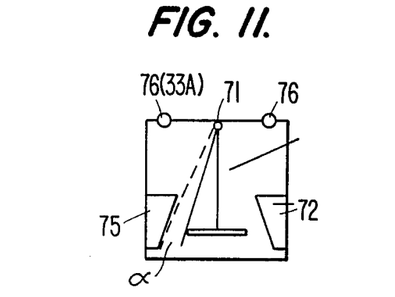
FIG. 11 schematically depicts the operation of the alarm system of FIG. 10.
Figure 12:
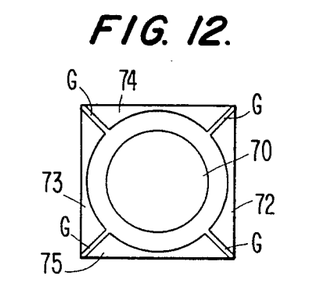
FIG. 12 is a schematic plan view of the audible level alarm arrangement of FIGS. 10 and 11.

FIGS. 10 to 12 schematically depict a level alarm system that can be used to actuate both the visible and audio level indicators for the camera back (see FIGS. 1 and 2, reference characters 33, 33A, 33B). The level alarm system includes a pendulum 70 which is mounted by a pivot mount 71 so as to be positioned symmetrically in the center of four contacts 72, 73, 74 and 75, disposed respectively diametrically opposite one another along the two planes X—X and Y—Y. The contacts 72, 73, 74, 75 are all spaced from one another by gaps G which are substantially less than the diameter of the pendulum head 70. The pendulum assembly 70, 71 and the contacts 72, 73, 74, 75 are disposed in a rigid housing 76. Housing 76 is mounted in a predetermined orientation with respect to the camera back casing 3 such that, when the camera back is in a position corresponding to correct level position in both the X and Y planes, the pendulum 70 is disposed exactly in the center and out of contact with any of the contacts 72 to 75. In the event there is a tilting of the pendulum by a predetermined amount (presume a setting of ½ degree tolerance for angle X in FIG. 11), the pendulum will abut contact 73 and close a circuit which will activate a light-emitting diode 76 corresponding to the indicator 33A of FIGS. 1 and 2. In a corresponding manner, deviations in the perpendicular plane or any combined deviations that will cause abutment of the pendulum with contacts 74, 75, will close a circuit activating indicator 33B. In the same circuit as the indicators 33A and 33B, audible speakers are activated, with different tones for different X and Y directions to indicate out of tolerance level positions in one or both of the X-Y planes.

The audible level system described with respect to FIGS. 10 to 12 can be incorporated within the camera back. Embodiments of the invention are also contemplated with the audible level indicator system incorporated in camera systems other than in the camera back. For this purpose, the FIG. 10 illustration depicts a magnetic base MB which can accommodate attachment of the system to any corresponding magnetizable base. Thus, the audible alarm system can be made as a portable unit which can be used with multiple cameras which have magnetizable mounting bases mounted thereon.

Other level indicator/alarm systems are contemplated which utilize a mercury bubble in a container, with respective contacts spaced around the perimeter thereof for closing circuits indicating out of tolerance level conditions in both X and Y planes.

Figure 13:
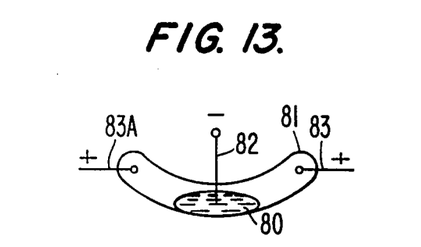
FIG. 13 is a schematic depiction of an audible level alarm system of the present invention utilizing a mercury bubble in a container.

FIG. 13 schematically depicts such an arrangement with mercury bubble 80 housed in a curved bottom container 81 which has electrical contact 82 always contacting the mercury bubble. Contacts 83 and 83A are selectively engaged to activate the alarm when the level is tilted a predetermined amount to move the bubble 80.

The levels are preferably user calibrateable by means of adjusting screws or the like, thus permitting the photographer to "fine tune" the level position to the particular camera being used.

It is also contemplated that various features of the audible level in systems described herein could be used in other environments with similar problems requiring non-visual level indications.

A feature in yet another preferred embodiment allows the communication of data from the film holder's internal electronics to the camera's lens via electrical interface means to actuate and control electromechanical setting means within the lens assembly to enable tho photographer to control all lens setting functions from the rear of the camera at the controls on the film holder. Lenses with this interface capability already exist within the SINAR brand cameras' and are incorporated hereinby previous reference.

Although the present invention has been described and illustrated in detail it is to be clearly understood that the same is by way of illustration and example only, and is not to be taken by may of limitation. The spirit and scope of the present invention are to be limited only by the terms of the appended claims.

What is claimed:

1. Film handling arrangement for large format view cameras, comprising:
    a film package holder for holding a film package containing at least one sheet of film covered by a selectively openable and closable light tight envelope, said film package holder defining a cavity for a film package between first and second holder parts,
    and film package holder control means for controlling movement of said first and second holder parts between an open position accommodating insertion and withdrawal of a single film package into and out of said cavity and a closed position clampingly holding said film sheet in position for exposure in a camera while said envelope is movable between a closed light tight position and an open position permitting exposure,
    said film exposure holder control means including means for positively guiding and moving said first and second holder parts between said open and closed positions while said film package holder is in a desired in-use position at a camera without application of forces that could cause camera and film package holder movement from a pre-set desired film plane position.

2. An arrangement according to claim 1, wherein said holder control means includes pneumatic actuation means for forcibly moving the first and second holder parts between said open and closed positions.

3. An arrangement according to claim 1, wherein said holder control means includes electric motor-driven actuation means for forcibly moving the first and second holder parts between said open and closed positions.

4. An arrangement according to claim 1, wherein said holder control means includes slot and pin means for guiding the first and second holder parts between the closed and open positions.

5. An arrangement according to claim 4, wherein the holder control means includes cable actuator means having an axially movable plunger which drives the pin means in the slot means.

6. An arrangement according to claim 4, wherein the holder control means includes a fluid actuator having a movable plunger attached to the pin means and driven by fluid pressure to drive the pin means in the slot means between first and second positions.

7. An arrangement according to claim 4, wherein the holder control means includes a linear motor having a plunger affixed to the pin means for driving the pin means in the slot means between first and second pin positions.

8. An arrangement according to claim 4, wherein the holder control means comprises a rotary motor having a transmission sections which converts rotary motion into linear motion, the transmission being connected to a plunger associated with the pin means for moving the pin means between first and second pin means positions.

9. An arrangement according to claim 1, wherein the holder control means comprises a first plurality of fluid expandable bladders positioned between the first and second holder parts and operable to move the first and second parts away from one another, and a second Plurality of fluid expandable bladders positioned for moving the first and second holder parts toward one another.

10. An arrangement according to claim 1, further comprising transport drive means for drivingly engaging a film package to transport the same into and out of a film exposure ready position in the cavity in the holder.

11. An arrangement according to claim 1, further comprising process rollers for selectively engaging the film package during unloading from the holder to cause release of instant photographic processing chemicals onto the film.

12. An arrangement according to claim 1, further comprising:
    adjusting means for accommodating photographer adjustment of the film holder to thereby adjust the orientation of the film plane of the sheet film to be exposed in the camera,
    and non-optical alarm means for apprising the photographer of any deviations of the film plane from a predetermined film plane orientation, without interrupting the photographer's observation of the image to be photographed on a viewing means.

13. An arrangement according to claim 12, wherein the alarm means includes audible alarm means.

14. An arrangement according to claim 1, wherein the film holder is provided as part of a detachably attachable camera back, which camera back also is provided with an integrally formed light-tight viewing hood, a selectively closable viewing opening in the hood, a video image transmission arrangement through the hood, and a non-optical film plane level alarm detector.

15. An arrangement according to claim 14, wherein said camera back further includes push button control means for actuating automatic mechanisms for carrying out the manipulation of the film package in the holder.

16. An arrangement according to claim 10, wherein said transport drive means includes detent means engageable in counter detent means of said film package so as to provide a positive drive of the film package.

17. An arrangement according to claim 10, wherein said transport drive means includes drivable friction rollers engageable with the film package so as to provide a positive drive of the film package.

18. An arrangement according to claim 17, wherein the drivable friction rollers have an elastic outer surface section for elastically clampingly engaging with the package during operation.

19. An arrangement according to claim 18, further comprising process rollers for selectively engaging the film package during unloading from the holder to cause release of instant photographic processing chemicals onto the film.

20. An arrangement according to claim 1, wherein the film holder is provided as part of a detachably attachable camera back, which camera back is provided with an integrated light metering system for both strobe and ambient light as enters the camera back via the taking lens.

21. An arrangement according to claim 20, wherein said light metering system means includes electrical data interface means to communicate with automatic lens assemblies for the remote setting and function control thereof.

22. Film handling arrangement for large format view cameras, comprising:
   film holder for holding a sheet of film in a camera,
   adjusting means for accommodating photographer adjustment of the film holder position to thereby adjust the orientation of the film plane of the sheet of film to be exposed in the camera,
   and non-optical alarm means for apprising the photographer of any deviations of the film plane from a predetermined film plane orientation with respect to two mutually perpendicular axes without interrupting the photographer's observation of the image to be photographed on a viewing means.

23. An arrangement according to claim 22, wherein the alarm means includes audio alarm means.

24. Film handling arrangement for large format view cameras, comprising:
   a film package holder for holding a film package containing at least one sheet of film covered by a selectively openable and closable light tight envelope, said film package holder defining a cavity for a film package between first and second holder parts,
   film package holder control means for controlling movement of said first and second holder parts between an open position accommodating insertion and withdrawal of a single film package into and out of said cavity and a closed position clampingly holding said film sheet in position for exposure in a camera while said envelope is movable between a closed light tight position and an open position permitting exposure,
   said film package holder control means including means for positively guiding and moving said first and second holder parts between said open and closed positions while said film package holder is in a desired in-use position at a camera without application of forces,
   adjusting means for accommodating photographer adjustment of the film holder to thereby adjust the orientation of the film plane of the sheet film to be exposed in the camera,
   and non-optical alarm means for apprising the photographer of any deviations of the film plane from a predetermined film plane orientation, without interrupting the photographer's observation of the image to be photographed on a viewing means.

25. Film handling arrangement for large format view cameras, comprising:
   a film package holder for holding a film package containing at least one sheet of film covered by a selectively openable and closable light tight envelope, said film package holder defining a cavity for a film package between first and second holder parts,
   film package holder control means for controlling movement of said first and second holder parts between an open position accommodating insertion and withdrawal of a single film package into and out of said cavity and a closed position clampingly holding said film sheet in position for exposure in a camera while said envelope is movable between a closed light tight position and an open position permitting exposure,
   said film package holder control means including means for positively guiding and moving said first and second holder parts between said open and closed positions while said film package holder is in a desired in-use position at a camera without application forces that could cause camera and film package holder movement from a preset desired film plane position, and
   wherein the film holder is provided as part of a detachably attachable camera back, which camera back also is provided with an integrally formed light-tight viewing hood, a selectively closable viewing opening in the hood, a video image transmission arrangement through the hood, and a non-optical film plane level alarm detector.

26. An arrangement according to claim 25, wherein said camera back further includes push button control means for actuating automatic mechanism for carrying out the manipulation of the film package in the holder.

27. Film handling arrangement for large format view cameras, comprising:
   a film package holder for holding a film package containing at least one sheet of film covered by a selectively openable and closable light tight envelope, said film package holder defining a cavity for a film package between first and second holder parts,
   film package holder control means for controlling movement of said first and second holder parts between an open position accommodating insertion and withdrawal of a single film package into and out of said cavity and a closed position clampingly holding said film sheet in position for exposure in a camera while said envelope is movable between a closed light tight position and an open position permitting exposure, said film package holder control means including means for positively guiding and moving said first and second holder parts between said open and closed positions while said film package holder is in a desired in-use position, and transport drive means for drivingly engaging a film package to transport the same into and out of a film exposure ready position in the cavity in the holder.

28. Film handling arrangement for large format view cameras, comprising:

a film package holder for holding a film package containing at least one sheet of film covered by a selectively openable and closable light tight envelope, said film package holder defining a cavity for a film package between first and second holder parts, film package holder control means for controlling movement of said first and second holder parts between an open position accommodating insertion and withdrawal of a single film package into and out of said cavity and a closed position clampingly holding said film sheet in position for exposure in a camera while said envelope is movable between a closed light tight position and an open position permitting exposure, said film package holder control means including means for positively guiding and moving said first and second holder parts between said open and closed positions while said film package holder is in a desired in-use position, and process rollers for selectively engaging the film package during unloading from the holder to cause release of instant photographic processing chemicals onto the film.

* * * * *